(12) United States Patent
Barnes

(10) Patent No.: US 6,993,533 B1
(45) Date of Patent: Jan. 31, 2006

(54) RELATIONAL DATABASE DRILL-DOWN CONVENTION AND REPORTING TOOL

(75) Inventor: Roderick Leon Barnes, San Antonio, TX (US)

(73) Assignee: BIF Technologies Corp., San Antonio, TX (US)

( * ) Notice: Subject to any disclaimer, the term of this patent is extended or adjusted under 35 U.S.C. 154(b) by 337 days.

(21) Appl. No.: 10/063,145

(22) Filed: Mar. 25, 2002

(51) Int. Cl.
 *G08F 7/00* (2006.01)
(52) U.S. Cl. ............... 707/102; 707/101; 707/104.1
(58) Field of Classification Search .......... 707/1–104.1
 See application file for complete search history.

(56) References Cited

U.S. PATENT DOCUMENTS

| | | | | |
|---|---|---|---|---|
| 5,603,025 A | * | 2/1997 | Tabb et al. ............... | 707/2 |
| 5,774,866 A | * | 6/1998 | Horwitz et al. ............ | 705/7 |
| 5,787,262 A | * | 7/1998 | Shakib et al. ............. | 709/205 |
| 5,787,416 A | * | 7/1998 | Tabb et al. ............... | 707/2 |
| 5,832,496 A | * | 11/1998 | Anand et al. ............. | 707/102 |
| 5,870,759 A | * | 2/1999 | Bauer et al. ............. | 707/201 |
| 6,279,033 B1 | * | 8/2001 | Selvarajan et al. ......... | 709/217 |
| 6,282,547 B1 | | 8/2001 | Hirsch ..................... | 707/102 |
| 6,341,286 B1 | | 1/2002 | Kawano .................... | 707/101 |
| 6,377,993 B1 | * | 4/2002 | Brandt et al. ............. | 709/227 |
| 6,631,402 B1 | * | 10/2003 | Devine et al. ............ | 709/217 |
| 2002/0184178 A1 | * | 12/2002 | Tasooji et al. ............. | 706/50 |
| 2002/0184187 A1 | * | 12/2002 | Bakalash et al. ........... | 707/1 |

* cited by examiner

*Primary Examiner*—Luke S Wassum
*Assistant Examiner*—Linh Black
(74) *Attorney, Agent, or Firm*—Eric Cernyar

(57) ABSTRACT

A system generates linked sets of drill-down-enabled reports of increasing levels of detail from one or more databases. Linking relationships between reports are defined using the query language of the databases. Result sets are obtained that includes (1) the sought-after data, and (2) metadata that identifies drill-down reports to be generated if related report elements are selected. When the query is executed, the system passes the sought-after data to a reporting application programming interface, which generates a report (e.g., a pie chart, 3-D bar chart, cross-tabbed table). If an end-user selects one of the report elements (e.g., a bar on the chart), the system maps the reported event to the associated data of the result set. If the associated data has corresponding meta-data containing a drill-down directive, the system then generates the report identified by the drill-down directive.

8 Claims, 11 Drawing Sheets

| Report Pattern Parameters ||
|---|---|
| Name | employee_listing —510 |
| Title | MoreBetter Traders —512 |
| Subtitle | Employee Listing —514 |
| Header Logo | Logo.gif —516 |
| Header | —518 |
| Footer | Page {P} of {N} on {D} at {T} —520 |
| Template | 3D_bar_chart_and_table —522 |
| Query<br><br>550 | SELECT —552<br>    e.EmployeeID as "Employee ID", —554<br>    e.FirstName as "First Name", —556<br>    e.LastName as "Last Name", —558<br>    sum(od.Quantity*od.UnitPrice) as "Total Sales", —560<br>    'x_title=Employee Last Name&y_title=Total —562<br>Sales&labels=2&columns=3' as mb_chart,<br>    'mb_report_name=employee_sales_detail_by_year_by_cat egory&employeeid=' \|\| e.EmployeeID \|\| '&employeename="' \|\| e.FirstName \|\| ' ' \|\| e.LastName \|\| '"' as mb_drilldown<br>                                                                   564<br>FROM —566<br>    Employees e, —568<br>    Orders o, —570<br>    Order_Details od —572<br>WHERE —574<br>    o.EmployeeID = e.EmployeeID —576<br>AND  od.OrderID = o.OrderID —578<br>GROUP BY —580<br>    e.EmployeeID,<br>    e.FirstName,<br>    e.LastName |
| Data Source | MoreBetter_Traders_Database.db —590 |

| Employee ID | First Name | Last Name | Total Sales | mb_chart | mb_drilldown |
|---|---|---|---|---|---|
| 1 | Nancy | Davolio | 10036.11 | x_title=Employee Last Name&y_title=Total Sales&labels=2&columns=3 | mb_report_name=employee_sales_by_year_by_category&employeeid=1&employee_name='Nancy Davolio' |
| 2 | Andrew | Fuller | 11211.51 | x_title=Employee Last Name&y_title=Total Sales&labels=2&columns=3 | mb_report_name=employee_sales_by_year_by_category&employeeid=2&employee_name='Andrew Fuller' |
| 3 | Janet | Leverling | 10238.46 | x_title=Employee Last Name&y_title=Total Sales&labels=2&columns=3 | mb_report_name=employee_sales_by_year_by_category&employeeid=3&employee_name='Janet Leverling' |
| 4 | Margaret | Peacock | 17296.60 | x_title=Employee Last Name&y_title=Total Sales&labels=2&columns=3 | mb_report_name=employee_sales_by_year_by_category&employeeid=4&employee_name='Margaret Peacock' |
| 5 | Steven | Buchanan | 6775.47 | x_title=Employee Last Name&y_title=Total Sales&labels=2&columns=3 | mb_report_name=employee_sales_by_year_by_category&employeeid=5&employee_name='Steven Buchanan' |

| Report Pattern Parameters ||
|---|---|
| Name | employee_sales_by_year_by_category —810 |
| Title | Employee Sales Details —812 |
| Subtitle | {employee_name}—814 |
| Header Logo | Logo.gif |
| Header | |
| Footer | Page {P} of {N} on {D} at {T} |
| Template | Crosstab —822 |
| Query<br><br>850 | SELECT<br>    to_char(o.OrderDate,'YYYY') as "Year",<br>    c.CategoryName as "Category",<br>    to_char(sum(od.Quantity*od.UnitPrice),'999999.99') as "Total Sales"<br><br>FROM<br>    Orders o,<br>    Order_Details od,<br>    Products p,<br>    Categories c<br>WHERE                          872<br>    o.EmployeeID = {employeeid}<br>    AND  od.OrderID = o.OrderID<br>    AND  p.ProductID = od.ProductID<br>    AND  c.CategoryID = p.CategoryID<br>GROUP BY<br>    to_char(o.OrderDate,'YYYY'),<br>    c.CategoryName |
| Data Source | MoreBetter_Traders_Database.db —890 |

```
                                                              /1000
┌─────────────────────────────────────────────────────────────────┐
│ SELECT                                                          │
│       column_name AS column_alias,    ——1010      /1020         │
│       . . . .                                                   │
│       drilldown_expression AS drilldown_metadata_column_heading │
│ FROM                                                   \1030    │
│       table_name AS table_alias,                                │
│       . . . .                                                   │
│ WHERE search_conditions . . . .                                 │
└─────────────────────────────────────────────────────────────────┘
```

FIG. 10

```
                                                              /1100
┌─────────────────────────────────────────────────────────────────┐
│ drilldown_expression :=                                         │
│ "report_name="<report name >[& <parameter name>="<parameter value> ] │
└─────────────────────────────────────────────────────────────────┘
```

FIG. 11

```
                                                              /1200
┌─────────────────────────────────────────────────────────────────┐
│ drilldown_expression :=                                         │
│ <report_name> [(<parameter value> , . . . )]                    │
└─────────────────────────────────────────────────────────────────┘
```

FIG. 12

```
REPORT AS report_name[(argument, . . .)]                —1310

DEFINE                                                   —1320
      report_name.title AS expression,
      report_name.subtitle AS expression,
      report_name.template AS template_name,
      . . . .

SELECT
      column_name AS column_alias,
      . . . .
FROM
      table_name AS table_alias,
      . . . .
WHERE search_conditions . . . .

DRILLDOWN TO drilldown_report_name[(argument, . . .)]    —1360

. . . .

END REPORT                                               —1390
```

FIG. 13

RELATIONAL DATABASE DRILL-DOWN CONVENTION AND REPORTING TOOL

BACKGROUND OF INVENTION

This invention relates generally to information processing, and, more particularly, to methods and apparatuses for generating and distributing reports from a relational database.

Graphical reports are commonly used to visually express information about selected properties or characteristics of various entities. For example, a report may contain a pie chart to express the relative profitability or expenses of various corporate divisions, where each division is represented by a slice of the pie. Typically, the information needed to generate a report is derived from a relational database that may contain, for example, a table showing the expenses and revenues of each division in a corporation. Detailed breakdowns of the expenses of each division might also be provided in other tables in the database.

When displaying a report, such as a pie chart, about certain properties or characteristics of various entities, it is often desirable to allow the user to select one of the slices (using, for example, a point-and-click device such as a computer mouse) in order to "drill down" to more detailed information about that particular slice. Continuing the pie chart example described above, one might configure the report so that if one selected one of the slices representing a corporate division, the computer would generate a new report displaying two more pie charts that broke down the profits and expenses of the division into separate categories.

Drill down capabilities can already be found in several retail applications. For example, the popular financial tracking application known as Quicken®, made by Intuit Inc., provides several built-in reports that enable a user to drill-down to more detailed reports. While Quicken® provides a familiar illustration of drill-down reports, its capabilities are provided specifically only for the specialized database that comes with the application. Moreover, that specialized application does not, and is not intended to, provide a reporting tool and drill-down convention by which an end-user or customer can define the reports to be generated and customize the drill-down relationships between them.

There are a variety of conceivable situations in which a company may want to develop its own set of inter-related reports from its own database, add drill-down capabilities, and also define what report(s) is/are displayed when a given pie slice, 3-D bar, or cross-tab cell is selected. There are some database reporting tools on the market that are designed to give a customer such power, including, for example, Cognos, Inc.'s "Improptu"®, and Crystal Decisions Co.'s "Crystal Reports."® Unfortunately for the customer, typical drilldown-capable reporting tools are not intuitively, dynamically, or easily implemented. Rather, typical drilldown-capable reporting tools require the customer to write additional code blocks in languages other than in the database query language ("DQL") used to interrogate the relational databases, in order to link one report to another. Typically, a separate block of programming code in a second language such as PL/SQL, Visual Basic, C++, Java, or JavaScript, has to be written, tested, debugged, and compiled for each report-to-report relationship. Alternatively, the programmer may have to use one of the vendor's specialized data structures. This makes report building a tedious, technically difficult, time-consuming, and expensive task.

U.S. Pat. Nos. 5,603,025 and 5,787,416, both to Tabb et al., which are herein incorporated by reference, describe a system that automatically recognizes related information by looking for primary keys that uniquely identify records in a given table. The system also automatically generates hyper-linked reports, as illustrated by FIGS. 6A through 6E of those patents, that enable an end-user to drill down to increasing levels of detail. As suggested by column 3, lines 17–25, the Tabb et al. inventions are intended to completely bypass the need for an end-user to use computer programming languages to create reports with drill-down functions. While the Tabb et al. patents describe a system with considerable utility, the automation and ease of use comes at the expense of the customer's ability to customize relationships between reports.

There is a need a system for specifying drill-down relationships between reports that is neither overly complex nor overly restrictive. In particular, there is a need for an intuitive, DQL-based or DQL-consistent reporting convention and/or tool that does not require the writing, debugging, and compiling of code blocks to define drill-down relationships between reports, where the code blocks are separate from the DQL queries that are used to generate the result set from which the report is generated. There is also a need for a reporting convention and/or tool that does not require multi-lingual implementation (e.g., structured query language and a complementary procedural programming language such as Microsoft Corporation's Visual Basic®).

A summary and detailed description of the invention is provided below. But first, for the benefit of readers having little or no familiarity with relational databases or related concepts, a very brief introduction to relational databases and relational database terminology is provided.

A relational database is, in the abstract, a collection of "relations." For most purposes, however, a relational database is better understood as a collection of tables. A relation (e.g., a table) comprises one or more entities (e.g., rows, a.k.a. "records" or "tuples") that are identified by certain characteristics, properties, or attributes (e.g., columns, a.k.a. "fields"). A table in a relational database has the following intuitive properties: each column describes a given characteristic, property, or attribute; each column is distinctly named; all values of a given column are of the same type; each row in the table is unique; and the relational properties of the database are not affected by column or row order. Moreover, the number of rows and columns in a table need not be fixed. In this respect, a table is distinguishable from a matrix or array, which have fixed row and column dimensions.

Typically, a relational database contains a plurality of tables that can be interrelated with each other because one or more properties in one table matches one or more properties in other tables. FIG. 4, for example, provides an example of a relational database structure 400 having five different relations. The "Products" relation 410 is shown with five properties labeled "ProductID," "ProductName," "CategoryID," "QuantityPerUnit," and "UnitPrice." The "Order_Details" relation 420 is shown with four properties labeled "OrderID," "ProductID," "Quantity," and "UnitPrice." Relations 410 and 420 each share a common property "ProductID." Likewise, the Orders relation 430 shares the property "OrderID" with the Order_Details relation 420, the Employees relation 450 shares the property "EmployeeID" with the Orders relation 450; and the Categories relation 440 shares the property "CategoryID" with the Products relation 410.

A database built in accordance with the relation 410 of FIG. 4 would typically contain 5 tables corresponding with each of the relations 410, 420, 430, 440, and 450. The table corresponding to relation 410, for example, would have five columns. The first row would contain the headings for the 5 columns, that is, "ProductID," "ProductName," "CategoryID," "QuantityPerUnit," and "UnitPrice." Below the first row would be a plurality of rows describing different products in accordance with the column headings. The other tables would also have column headings corresponding to each of the properties of the associated relation, and rows below them describing various orders, order details, product categories, employees, and so on.

Relational databases are designed to be powerful, flexible ways of storing, categorizing, and associating data. The power of a relational database is illustrated by the following example. Using the relational database structure described in FIG. 4, suppose someone wanted to find out how many Widget Class products, a special category of products listed in the Categories relation 440, that a particular Employee had sold in a given year. To do so, one would use the Employees relation 450 to identify the EmployeeID associated with that particular employee. Then that EmployeeID, along with the specified year, would be used to filter out all the OrderIDs listed in the Orders relation 430 that had the same EmployeeID and an OrderDate falling within the specified year. Similarly, the Categories relation 440 would be used to identify the CategoryID associated with the Widget Class category of products. Then the Products relation 410 would be used to filter out all of the ProductIDs associated with the identified CategoryID. Next, the Order_Details relation 420 would be used to identify all the orders that had both one of the OrderIDs identified above, and one of the ProductIDs identified above. From this final subset of orders, the sum of the products of Quantity times UnitPrice would be computed to determine the result.

A relational database management system (RDBMS) is an interface between a user and a relational database that allows the user to create, modify, update, and delete relations such as those shown in FIG. 4, as to well as to retrieve information like that described above by linking various relations together. In the past two decades, the software industry has largely standardized the syntax used to create, manipulate, delete, and update information in a relational database. This most widely accepted set of query language standards is "structured query language," also known by its acronym SQL. Those skilled in the art are familiar with many alternative database query languages, each having its own particular syntax. For example, query language syntax standards have been proposed for Extensible Markup Language ("XML").

SUMMARY OF INVENTION

This invention is directed to, but not limited by, one or more of the following objects, separately or in combination:

- to provide an easy-to-use, scalable, and manageable reporting tool to enable businesses to gather and publish large amounts of data in a manner relevant to their customers;
- to provide customers access to up-to-date information in an easy-to-read, easy-to-reach, and easy-to-relate format;
- to summarize data with visual aids such as charts and graphs;
- to provide well-formatted views of the details behind any summary;
- to provide the capability to drill-down from a higher-level report to a more specific report (i.e., via a bar on a bar chart, a pie slice on a pie chart, a point on a line chart, an element on a table, an image, or a portion of text), thus giving data meaningful interconnectedness;
- to provide a reporting tool that enables reports to be formatted or reformatted in multiple formats, such as HTML, XML, Adobe Acrobat's Portable Document Format®, an Excel® spreadsheet format, and Microsoft's Rich Text Format®;
- to provide a reporting tool that enables the definition of drill-down relationships between reports using only database query language expressions and without using procedural language expressions or code that must first be compiled;
- to develop a reporting system for a relational database that can be implemented efficiently to disseminate information through the web using graphics, charts, cross tabs, tables, and other elements;
- to provide a dynamically driven, drill-down capable, remotely administrable, and yet centrally processed reporting application for a relational database;
- to enable organizations to deliver comprehensive, dynamic, eye-catching reports internally to its executives or externally to its customers using only a thin-client and ubiquitous web browser;
- to effectively deliver information ranging from high-level executive reports to detailed technical reports for support staff; and
- to provide security for all reports preventing unauthorized viewing of sensitive information.

Before proceeding further with the "summary" of the invention, the reader (perhaps a judge or a juror) is forewarned that the following summary is intended merely to recite, in almost word-for-word fashion, the language of the appended claims. This is a common convention employed by patent agents and attorneys to ensure that all of the subject matter of the claims finds explicit support and "antecedent basis" in the specification. Unfortunately, such summaries are frequently difficult to read and comprehend. The summary that follows is no exception. It is suggested that those looking for a brief overview of the present invention read the abstract. Those seeking to enrich their understanding further should read the detailed description. Those simply wanting to know what is claimed should read the claims themselves, because the formatting of the claims is generally easier to follow than the summary recital that follows.

Accordingly, a method is provided to specify drill-down relationships between a first report and one or more other reports in a computer language that includes query language syntax operable to interrogate one or more computer databases, the method comprising the following actions: specify a first expression in the query language syntax of the computer language, the first expression operable to retrieve information from the one or more computer databases, the information being operable to be displayed in the first report; communicate the first expression to a relational database management system; and specify a second expression in the computer language to define one or more drill-down relationships between the information operable to be retrieved by the first expression and the one or more other reports; wherein the first and second expressions are specified in a computer application operable to interface with a relational database management system; and wherein the first expression comprises a column expression operable to retrieve a column or an operation on a set of columns from the one or more computer databases; and wherein the second expression is specified in the query language syntax of the computer language; and wherein the second expression comprises a column expression operable to generate a column of character strings.

Also, a method is provided to generate a first report having one or more drill-down relationships with one or more other reports, where the first report displays information retrieved from at least one computer database, the method comprising the following actions: in response to a first database query language expression specified in a block of source code, retrieve data from the at least one computer database, where the data is operable for use in generating the first report; in response to a second expression in the same block of source code, establish the one or more relationships between the data and the one or more other reports. More specific embodiments of this method include one or more of the following actions: providing a relational database management system to manage the at least one computer database; provide a reporting application to communicate with the relational database management system; interrogating the relational database management system with the database query language expression; retrieving a result set of data from the relational database management system; and transferring a result set of data from the relational database management system to the reporting application. The action of establishing the one or more relationships between the data and the one or more other reports may be performed by the reporting application.

A further method is provided to specify a drill-down relationship between a first report and a second report using a query language having predefined syntax for interrogating databases, the method comprising the following actions: specify a first expression in the query language syntax, the first expression being operable to retrieve data from a database into a result set operable to be used to generate the first report; and specify a second expression in the query language syntax, the second expression being operable to generate metadata to incorporate into the result set, where the metadata establishes the drill-down relationship between the first report and the second report. More specific embodiments of this method comprise specifying a third expression in query language syntax, the third expression being operable to retrieve data from the database into a second result set operable to be used to generate the second report; providing an object that encapsulates the third expression; and specifying a name for the object. The metadata may comprise a character string that identifies the name of the object that encapsulates the third expression. Also, the first and second query language expressions may comprise column expressions. Further, the metadata may comprise at least one column of a table, where the column is labeled with a predefined keyword that identifies the column as containing drill-down metadata. Also, the first report may have characteristics, where the method further comprises specifying a fourth query language expression operable to create additional metadata that defines characteristics of the first report. The retrieved data may comprise one or more columns, and the additional metadata may specify one or more of the columns to display in the first report. The first report may also include formatting characteristics, where the additional metadata also specifies one or more of those formatting characteristics.

Yet another method is provided to generate a set of linked reports comprising the steps of: executing a first query language statement to generate a first result set comprising data and metadata, where the metadata defines a relationship between the data and a drill-down report; binding the data to a first template operable to display a first graphical object on a graphical user interface, where the first graphical object comprises a plurality of distinctly visible elements corresponding to a plurality of distinct relational database entities, and where the interface is operable to generate an event if a user selects any one of the plurality of distinctly visible elements, whereby the particular element selected can be identified; publishing a report containing the first graphical object on the graphical user interface; and if the user makes a selection, then identifying the selected element by mapping it to the corresponding data and metadata; processing the metadata to identify the drill-down report to which the data is related; executing a second query language command corresponding to the identified drill-down report, where the second query language command generates a second result set comprising further data; binding the further data to a second template operable to display a second graphical object on the graphical user interface; and publishing the drill-down report on the graphical user interface, where the drill-down report contains the second graphical object.

A yet further method is provided to produce linked first and second reports to a user, the second report being provided in response to the user's selection of an element of a first report, the method comprising the actions of: retrieve a first object that defines characteristics of the first report, the first object including a first query language statement operable to retrieve a first data set from a relational database, the first object also including a linking instruction that specifies a linking relationship between at least a portion of the first data set and the second report, the first object further specifying a first report template to which the first data set is operable to be bound; transmit the first query language instruction to a relational database management system; retrieve the first data set from the relational database management system in response to the first query language instruction; bind at least a portion of the first data set to the first report template; publish the first report; wait for the user to select an element of the first report; if the user selects an element of the first report, map the user's selection to a corresponding portion of the first data set; if the linking instruction specifies a linking relationship between the second report and the portion of the first data set corresponding to the user's selection, then retrieve a second object that defines characteristics of the second report, the second object including a second query language instruction operable to retrieve a second data set from a relational database, the second object further specifying a second report template to which the second data set is operable to be bound; retrieve the second data set from the relational database management system in response to the second query language instruction; bind the second data set to the second report template; and publish the second report. In a more specific embodiment of this method, the linking instruction also includes a parameter to pass to the second object and to modify the second query language instruction therein, the method further comprising translating the second query language instruction to incorporate the parameter passed by the linking instruction if the action of retrieving the second object is performed.

In addition to these methods, a reporting apparatus is provided for a relational database comprising: a computer; a plurality of report pattern objects residing on the computer, each object defining the characteristics of a report, including a query language statement operable to retrieve a result set from the relational database; a data retrieving module operable to retrieve the result set specified by the query language statement; a result set handling module operable to identify drill-down-report-specifying metadata in the result set; and an event handling module operable to retrieve, in response to user requests, report pattern objects corresponding to drill-down reports specified in the metadata of the result set. The reporting apparatus further comprises an editing module operable to enable the editing of the report pattern objects; a translating module operable to incorporate parameters passed by the event handling module into the query language expressions of report pattern objects retrieved in response to user requests for drill-down reports; a reporting module operable to generate report code corresponding to the result set on a user interface; and a presentation handler operable to display reports in accordance with the report code generated by the reporting module. In one embodiment, the data retrieving module comprises at least a portion of a relational database management system.

Also, a computer system is provided, on which a relational database application is running, the computer system comprising: a plurality of linked report pattern objects containing query instructions operable to generate a result set constructed at least in part with data from a relational database; a first logic circuit created by the relational database application, the first logic circuit being operable to retrieve one or more of the plurality of report pattern objects; a second logic circuit created by the relational database application, the second logic circuit being operable to identify drill-down-report-specifying metadata in a result set obtained from a relational database; and a third logic circuit created by the relational database application, the third logic circuit being responsive to user requests for drill-down reports, whereby the computer system is operable, in response to user requests, to retrieve report pattern objects corresponding to the drill-down reports specified in the metadata of the result set. The computer system further comprises a fourth logic circuit created by the relational database application, the fourth logic circuit being operable to enable the editing of report pattern objects; a fifth logic circuit created by the relational database application, the fifth logic circuit operable to incorporate parameters specified in the drill-down-report-specifying metadata into the query language instructions of report pattern objects retrieved in response to user requests for drill-down reports; and a sixth logic circuit operable to publish a report corresponding to the result set on a user interface.

Furthermore, a system is provided for generating linked reports comprising: means for specifying drill-down relationships between reports; means for publishing reports based on underlying data, where the reports contain a plurality of user-selectable graphical elements; means for mapping user selections of graphical elements in published reports to a corresponding portion of the underlying data; and means for identifying the drill-down relationships between reports.

These and other objects, features, and advantages of the present invention will be readily apparent to those skilled in the art from the following detailed description taken in conjunction with the annexed sheets of drawings, which illustrate the invention.

BRIEF DESCRIPTION OF DRAWINGS

FIG. 5 is a functional embodiment of an interface for defining the parameters of a report, showing illustrative structured query language commands fashioned to operate on a database structured in accordance with FIG. 4.

FIG. 6 displays a portion of an illustrative result set returned by the search query of FIG. 5, showing metadata of the result set and the report for identifying and passing parameters to a drill-down report.

FIG. 8 provides illustrative parameters defined for the drill-down report identified in the search query of FIG. 5 and the corresponding metadata of FIG. 7.

FIG. 10 depicts a drill-down statement nested within an SQL SELECT statement, as one embodiment of the drill-down convention of the present invention.

FIG. 11 depicts a preferred syntactical embodiment of a drill-down string expression for identifying and passing parameters to a drill-down report.

FIG. 12 depicts an alternative syntactical embodiment of a drill-down expression for identifying and passing parameters to a drill-down report.

FIG. 13 depicts one embodiment of a possible extension to a database query language that could incorporate and standardize, in part, the concepts of the present invention.

DETAILED DESCRIPTION

Figure 1:
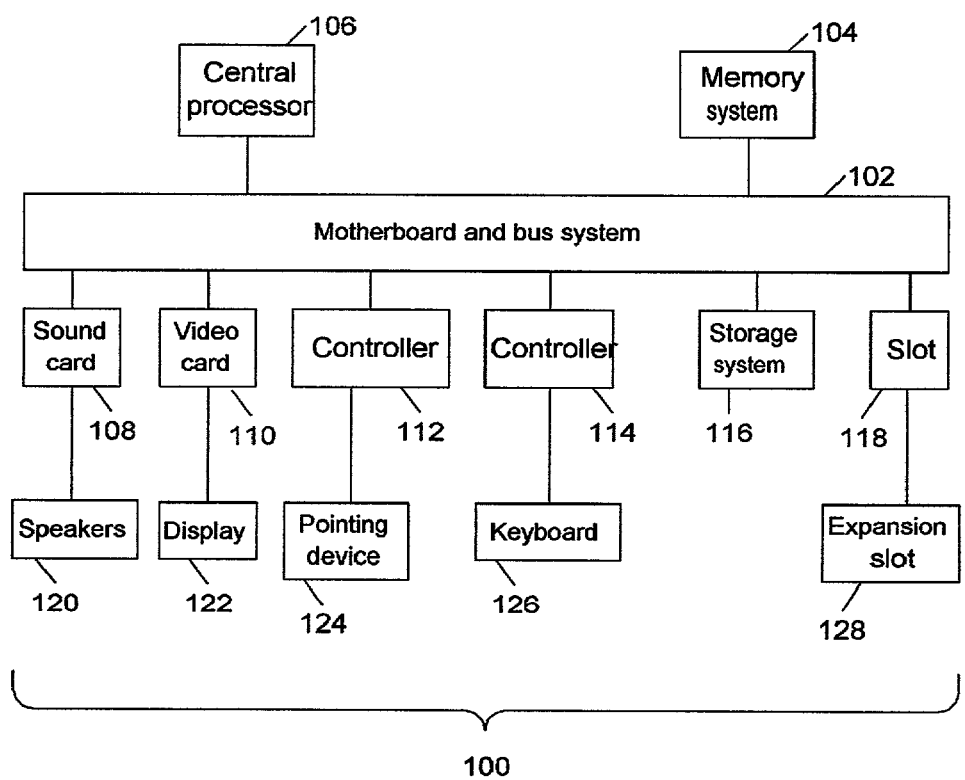
FIG. 1 is a block diagram of a computer system on which the invention may be implemented.
Figure 2:
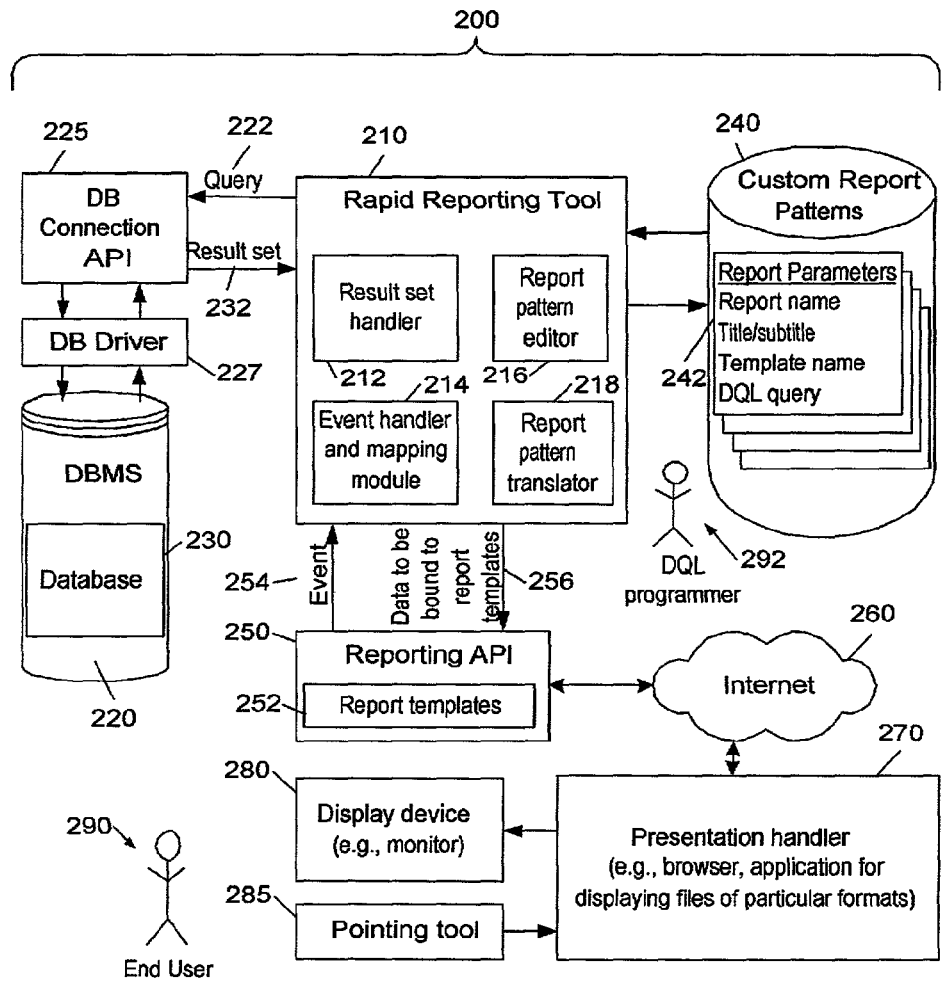
FIG. 2 is a block diagram of one embodiment of the software system of the present invention, illustrating the functional relationships between a database management system, a rapid reporting tool, a reporting application programming interface, and a remote client user interface.
Figure 3:
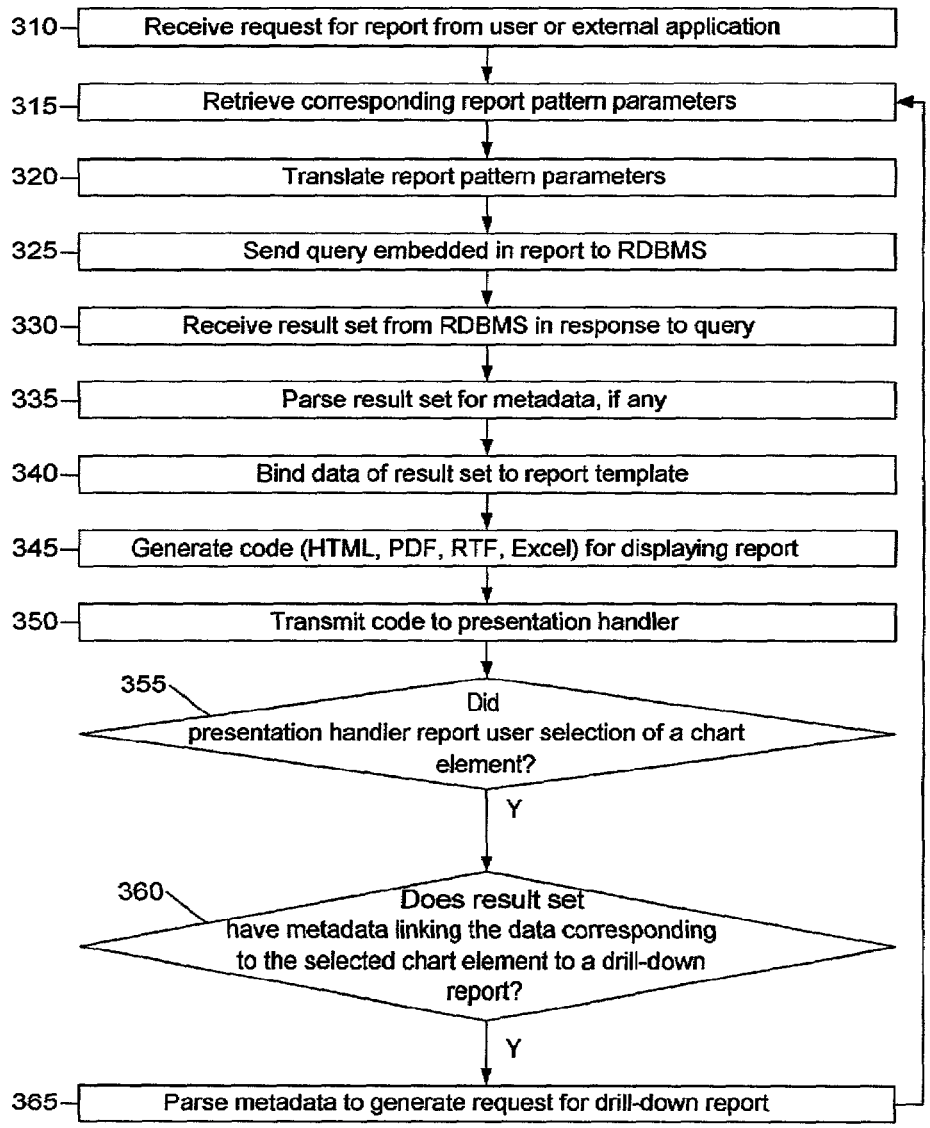
FIG. 3 is a flow diagram of a method of publishing drill-down reports in response to user selection.

The principles of the present invention can be most easily understood by referring to FIGS. 4 through 9 and the accompanying specification. Those figures and the accompanying specification provide a specific illustration of a preferred convention and method to generate reports and to define the drill-down relationships between those reports. It is suggested that those who wish to quickly comprehend the ingenuity of the present invention skip to those sections of the specification. But not all aspects of the present invention are intended to be limited to that specific illustration. FIGS. 1–3 provide a "big picture" overview of one aspect of the present invention the structural and functional interrelationships between one or more computers and a plurality of software modules that implement the drill-down convention. FIGS. 1–3 are included first because they provide some of the fundamental elements of many of the claims that follow. (Of course, this statement should not be meant to imply its converse that all of the elements illustrated in FIGS. 1–3 are critical, or even fundamental, to the invention).

FIGS. 10–13 illustrate a different but related aspect of the present invention different syntactical embodiments of the drill-down convention itself. Because part of the utility and novelty of the present invention is providing DQL programmers with a method and convention for defining drill-down relationships between reports, some of the claims are directed to this aspect as well.

Turning now to FIG. 1, a block diagram of a computer system 100 is shown on which the invention may be implemented. The computer system 100 comprises a central processor or logic circuit 106 that, via a motherboard and bus system 102, accesses, interprets, and manipulates bits of data dynamically or statically stored on a memory system 104 and a storage system 116. In response to various interpreted commands, the central processor 106 receives bits (e.g., streams of electrons, holes, or photons, etc.) from a pointing device 124 and keyboard 126 via controllers 112 and 114, respectively, and transmits bits to a sound card 108 connected to speakers 120, a video card 110 connected to a display 122, and a slot 118 connected to an expansion slot 128. Of course, it will be understood that while the invention described herein may be implemented wholly on a single computer system 100, in many instances different aspects of the invention will be implemented on multiple computer systems 100, each having their own central processors 106, where each computer system 100 is in communication with, or capable of being in communication with (e.g., via a local area network and/or the Internet), the other computer systems 100 on which the invention is implemented.

FIG. 2 is a block diagram of one embodiment of the software system 200 of the present invention, illustrating the functional relationships between a database management system (DBMS) 220 including a database 230, a rapid reporting tool 210, a reporting application programming interface (API) 250, and a presentation handler 270 on a remote client user interface. The first component of the software system 200 is one or more operating systems (not shown) that manage access between software applications and the resources of a computer. The second component of the software system 200 is the DBMS 220, which is capable of building, accessing, and manipulating a database 230 using a standard database query language such as structured query language (SQL). The DBMS 220 is preferably one of the many commercial relational DBMSs on the market, such as Oracle®, Microsoft's SQL Server ®, Microsoft Access®, or Borland's Interbase®.

The third component of the software system 200 is the reporting API 250, which provides report templates 252 for producing reports such as bar charts, pie charts, and cross tab charts. The reporting API 250 is preferably capable of publishing such reports into a variety of formats, such as hypertext markup language (HTML), extensible markup language (XML), Adobe Acrobat PDF®, rich text format, or Microsoft Excel® format. A preferred embodiment utilizes the Style Report® API made by InetSoft Technology Corp.® One of the advantages of the Style Report® API is that it is based on Java,® making it platform-independent.

The reporting API 250 is preferably capable of incorporating hyperlinks into its reports. The reporting API 250 also preferably acts as an intermediary between an end user 290 (e.g., a corporate executive or client) seeking reports and the rapid reporting tool 210. The reporting API 250 generates the code for publishing a requested report and transmits it via a computer bus, computer network, or the Internet 260 to the end user's workstation (of which only the display device 280 and pointing tool 285 are shown). At the user's workstation, a presentation handler 270, such as an Internet browser, word processor, spreadsheet, or PDF file reader, translates the code into a readable format. The report is then published on the display device 280 for the benefit of the end user 290. If the end user 290 requests a drill-down report by selecting some element (e.g., a pie slice from a pie chart, a bar from a bar chart, or a row from a cross tab report) of the report, then the presentation handler 270 transmits the user request event back to the reporting API 250.

The fourth component of the software system 200 is the rapid reporting tool 210, which provides an intuitive, DQL-compatible convention and interface for defining reports and specifying the drill-down relationships between them. The rapid reporting tool 210 is a combination of different modules, including a report pattern editor 216, a report pattern translator 218, a result set metadata handler 212, and an event handler and mapping module 214. The preferred embodiment of the rapid reporting tool 210 is the MoreBetter Reports® product recently introduced to market by BIF Technologies, Inc., of San Antonio, Tex., the assignee of the present invention. The MoreBetter Reports® product incorporates many, but not all, of the aspects of the present invention. As of the time this application is being drafted, the product is described on BIF Technologies" website, http://www.morebettersolutions.com.

The report pattern editor 216 provides an interface with which a DQL programmer 292 can define the parameters 242 of a report. The interface provides the DQL programmer 292 with fields to specify the report name, the report title and subtitle, the name of the report template 252 that provides the graphical framework for the report, and the DQL query to generate the data set on which the report will be based. After the DQL programmer finishes specifying the report pattern parameters 242, they are stored in a custom report patterns database 240. (It should be noted that the custom patterns database 240 may optionally be a subset of the database 230).

The report pattern translator 218 intercepts any request received by the software system 200 to publish a report, retrieves the parameters 242 of the requested report, parses the DQL query, and substitutes special elements, if any, in the query (e.g., scripts embedded in curly brackets such as element 872 of FIG. 8) with arguments passed with the request for the report. After performing this "translation," the rapid reporting tool 210 is ready to submit the query 222 to the DBMS 220.

The result set handler 212 intercepts the result set 232 returned by the DBMS 220 in response to a query 222 and parses it in search of "metadata." Metadata is definitional data that describes the context, quality, and characteristics of the non-metadata data of the result set 232. For example, the metadata may define drill-down relationships between individual records of the result set and other reports identified in the metadata. The metadata may also define formatting characteristics of the intended report. An example of result set metadata is illustrated the two right-most columns of FIG. 6. The specific lines 562 and 564 of the DQL query 550 used to generate that illustrative metadata are depicted in FIG. 5. Preferred conventions for creating this metadata are discussed later, in conjunction with FIGS. 4–13. After parsing and interpreting the metadata, if any, the result set handler 212 binds part or all of the non-metadata data 256 to the report templates 252 of the reporting API 250.

The event handler and mapping module 214 intercepts user request events 254 for drill-down reports from the reporting API 250, and maps that event to the metadata associated with the graphical element that the end user 290 selected. The module 214 then parses the metadata to identify the name of the selected drill-down report and any arguments that should be passed to the selected report. The rapid reporting tool 210 then retrieves the parameters 242 of the requested drill-down report from the custom report patterns database 240. Then, the cycle repeats itself. The report pattern translator 218 translates the drill-down report parameters 242 by incorporating the passed arguments, if any, and submits the query to the DBMS 220. The result set handler 212 parses the result set for metadata, and so on.

Preferably, the rapid reporting tool 210 is written in a platform-independent language such as Java, so that it can be combined with any backend DBMS and easily ported to a variety of different computer architectures and operating systems.

FIG. 2 also depicts two other components a database connection application programming interface 225 and a database driver 227 that intermediate between the rapid reporting tool 210 and the database 230. The preferred embodiment of the database connection application programming interface 225 is Sun Microsystems's JDBC®. Alternatives include Microsoft's Open Database Connectivity® (ODBC) API and Oracle's Oracle Call Interface® (OCI) API. The preferred database driver 227 is whatever driver the DBMS 230 provider provides to interface with the database connection application programming interface 225. One advantage of the division of labor between different software applications or modules depicted by FIG. 2 is that the rapid reporting tool 210 does not have to be altered or recompiled for different operating systems or for different DBMSs. This enables the rapid reporting tool 210 to be highly portable across multiple computer platforms.

Before moving on to FIG. 3, it is important to realize that the various components of the software system 200 could be arranged differently, or combined in whole or in part, without departing from the written description of the present invention. For example, existing DBMSs 220 or reporting APIs 250 may be enhanced to incorporate some or all of the modules of the rapid reporting tool 210 of FIG. 2. A fully featured DBMS 220 could be created to incorporate the rapid reporting tool 210 and the reporting API 250. Likewise, the components of software system 200 could be broken into discrete parts themselves. The result set handler 212, event handler and mapping module 214, report pattern 216, and report pattern translator 218 may exist as independent modules or subcombinations of modules. It will be understood that the present invention, as described and explained, literally extends to these embodiments as well.

While FIG. 2 focused on the structural interrelationships between different functional components of one embodiment of the present invention, FIG. 3 focuses on the functional flow itself. The description that follows restates and amplifies the functional concepts already explained in connection with FIG. 2.

FIG. 3 is a flow diagram of a method of publishing drill-down reports in response to user selection. In block 310, a request for a report is received from a user or external application. In block 315, the corresponding report pattern parameters identifying a report template and containing a database query are retrieved. In block 320, the parameters are translated to incorporate any passed arguments. In block 325, the query embedded in the report is submitted to the relational database management system or module to retrieve the requested data. In block 330, the result set is received from the DBMS in response to the query. Because the result set may contain metadata defining drill-down relationships to other reports, in block 335 the result set is parsed for such metadata, if any. In block 340, the real data (the non metadata data) of the result set is bound to the report template. In block 345, code is generated in one or more standard formats, such as hypertext markup language (HTML), Adobe's Portable Document Format® (PDF), Microsoft's Rich Text Format® (RTF), or Microsoft's Excel® format, for displaying the report. In block 350, the report code is transmitted to a presentation handler, which publishes the report. If, as depicted in decision block 355, the presentation handler reports user selection of a chart element, and if, as depicted in decision block 360, the selected chart element corresponds to metadata in the result set identifying a drill-down report, then in block 365, the metadata is parsed to generate a request for a drill-down report, and the process repeats itself with block 315.

The functions of FIG. 3 have been described as "blocks" rather than "steps" because the order in which the functions are performed is not necessarily critical. While it will be apparent that some of the steps should be performed in the order displayed, some steps may be interchanged without departing from the literal scope of the invention. For example, the function described in block 335 could be done after the function of block 340, or even combined with the function of block 365.

Figure 4:
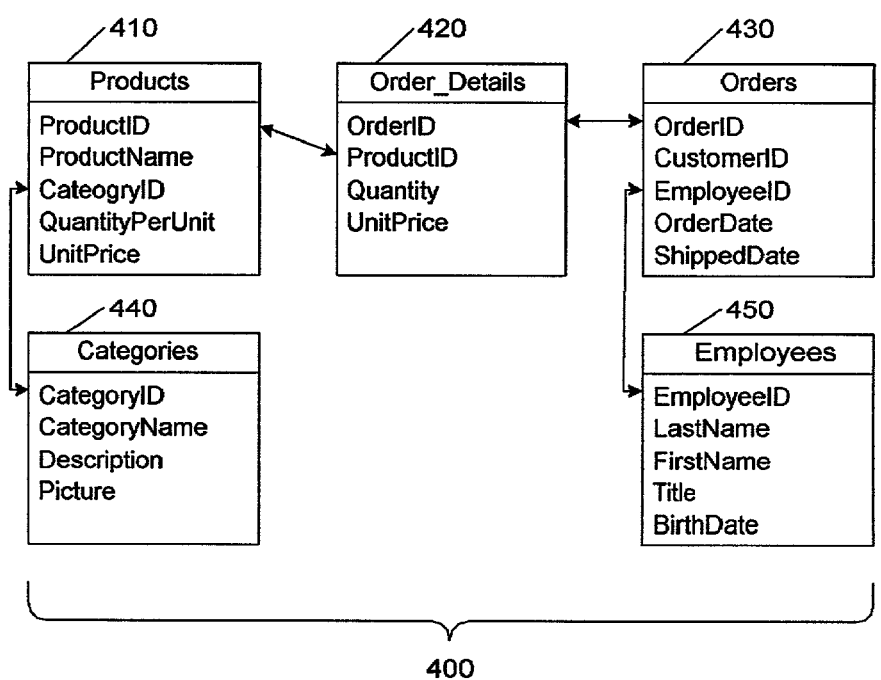
FIG. 4 is a block diagram illustrating an example of a structure of a relational database from which the illustrative queries and reports of FIGS. 5 through 9 derive their data.

FIG. 4 is a block diagram illustrating an example of a structure of a relational database from which the illustrative queries and reports of FIGS. 5 through 9 derive their data. FIG. 4 is described in the background section of this application.

FIG. 5 is a functional embodiment of a computer environment or interface 500 for defining the parameters of a report, showing illustrative SQL commands fashioned to operate on a database structured in accordance with FIG. 4. It is within this interface 500 that a DQL programmer can both create a report and specify drill-down relationships between that report and other reports. How this is done is explained below.

The interface 500 illustratively provides the following fields in which information related to defining and presenting a report can be specified: a name field 510 to identify the name of the report; a title field 512 and subtitle field 514 to be published with report; a header logo field 516 to specify a logo to publish with the report; header and footer fields 518 and 520, respectively; a template identifier field 522 to identify a report template (such as a bar chart, pie chart, cross tab chart, or some combination of like charts) to graphically display the data; a query field 550 to specify a query for the data to be displayed; and a data source field 590 to specify the database from which to retrieve the data. The identified fields are not intended to be all-inclusive. The interface 500 may well provide fields for entering other specifications.

The query field 550 depicts the familiar SQL commands "SELECT"552, "FROM"566, "WHERE"574, "AND"578, and "GROUP BY"580. In this illustrative example, the query requests that a result set be retrieved from the "MoreBetter_Traders_Database.db" (line 590) containing a row for each employee in the "Employees" table (line 568). Lines 554, 556, and 558 specify that each row should include the "EmployeeID," "FirstName," and "LastName" fields from the "Employees" table. Furthermore, the "AS" expressions specify that the first three columns of the result set should be labeled "Employee ID," "First Name," and "Last Name." Line 560 requests that another column, labeled "Total Sales," be included in this result set. The values in the "Total Sales" column are to contain the summation of all the products of the "Quantity" and "UnitPrice" fields of the "Order_Details" tables (see line 572), where the following two conditions are met: the "OrderID" of the "Order_Details" table matches the "OrderID" of the "Orders" table (lines 570, 578); and the "EmployeeID" of the "Employees" table matches the "EmployeeID" of the "Orders" table (line 576). These portions of the query are readily understandable to those familiar with SQL and similar query languages.

For purposes of this illustration, the most important lines depicted in the query field are lines 562 and 564. Significantly, these lines instruct the DBMS to include two additional columns, containing strings of characters, to the result set. These strings of characters constitute "metadata," that is, definitional data used to describe the context, quality, and relational characteristics of the non-metadata data of the result set. In accordance with the present invention, it is by constructing a DQL query to create metadata that the DQL programmer defines linking relationships between the report to be generated by the parameters of FIG. 5, and other drill-down reports (whose parameters are specified elsewhere, for example, as shown in FIG. 8).

In this example, line 562 instructs the DBMS to include a fifth column labeled "mb_chart" in the result set. It also instructs the DBMS to include, in the fifth field of each record in the result set, the following string:

x_title=Employee Last Name&y_title=Total Sales&labels=2&columns=3

Indeed, the reader will note that this very string repeatedly appears in the fifth column of FIG. 6.

Likewise, line 564 instructs the DBMS to include a sixth column labeled "mb_drilldown" in the result set. Unlike line 562, this line instructs the DBMS to include unique strings in the sixth field of each row in the result set. These strings each specify a drill-down report and two arguments (i.e., the employee ID and the employee name), at least one of which is unique, to pass to that report. The content of these strings is depicted in the sixth, or right-most column of FIG. 6. The manner in which these particular metadata strings are interpreted is explained later, in connection with FIG. 7.

To make it clear that the fifth and sixth columns of the result set will contain metadata, lines 562 and 564 illustratively instruct the DBMS to label those columns with unique labels such as "mb_chart" and "mb_drilldown," which, it is hoped, are not already being used by the database designer or user to describe real data. In this connection, it will typically be the case that predefined metadata labels should be used, so that the reporting tool 210 (FIG. 2) (i.e., the tool that processes the result set before binding the real data to the report template) can distinguish the metadata from the real data. In the alternative, it would of course be possible to standardize a simpler term, like "drilldown," as a reserved word and to configure the reporting tool 210 or DBMS 220 (FIG. 2) to recognize such labels as referring to metadata. Such alternative conventions are discussed later in connection with FIGS. 10–13.

Before turning to FIG. 6, the curly brackets in line 520 should be noted. These particular curly brackets, and the arguments contained therein, instruct the reporting tool 210 to substitute the page number of the report for {P}, the total number of pages in the report for {N}, the date the report was created for {D}, and the time the report was created for {T}. The significance of the curly brackets will be further illustrated and described in connection with line 872 of FIG. 8.

FIG. 6 displays a portion of an illustrative result set returned by the search query of FIG. 5. The reader will quickly recognize the correspondence between the labels and data of the first four columns 610, 620, 630, and 640 and the query commands of lines 554, 556, 558, and 560 of FIG. 5. Likewise, the reader will recognize the correspondence between the query commands of lines 562 and 564 and the last two columns 650 and 660 of the result set. Significantly, the last column 660 depicts "drilldown report metadata" for identifying and passing parameters to a drill-down report named "employee_sales_by_year_by_category." Column 650 depicts "formatting report metadata" used in specifying some of the characteristics of the report. The "report metadata" of columns 650 and 660 should not be confused with the "result set metadata" of the top row (e.g., "Employee ID," "First Name," "Last Name," etc.).

Figure 7:
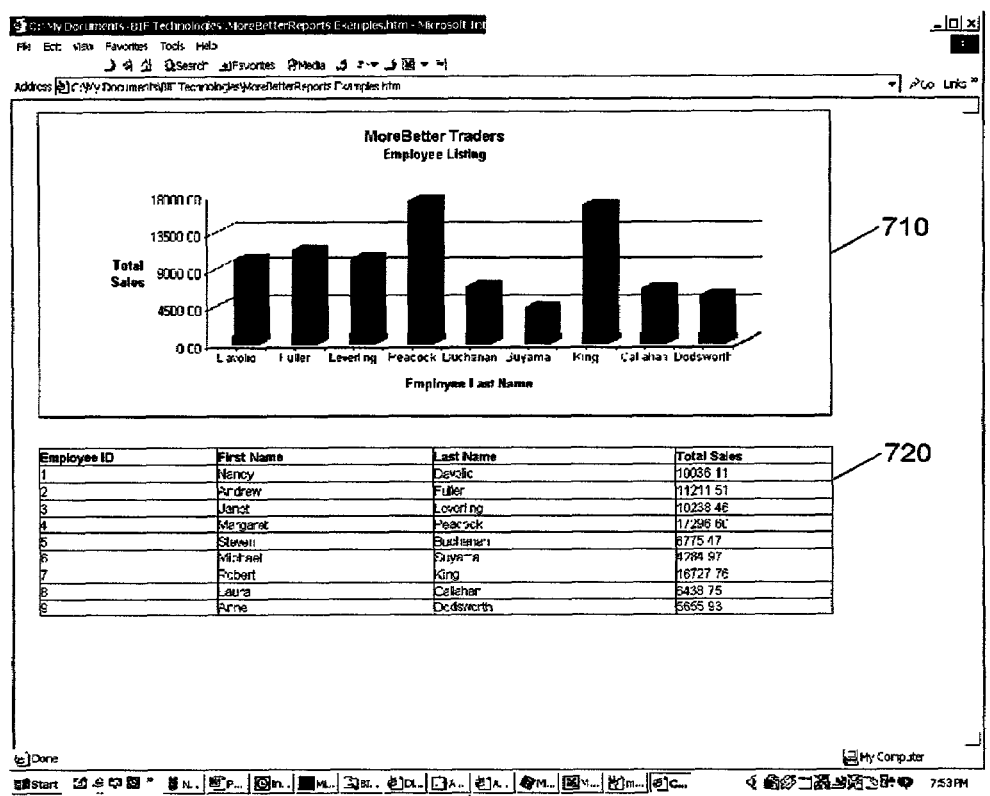
FIG. 7 is a bitmap screenshot of a report generated in accordance with the report parameters of FIG. 5.

FIG. 7 is a bitmap screenshot 700 of a report generated in accordance with the report parameters of FIG. 5. As suggested by the name illustratively given in the template field 522 of FIG. 5, the screenshot 700 depicts two graphic elements a 3-D bar chart 710 and a table 720. The reader will also notice a correspondence between the title and subtitle of the 3-D chart and the specifications given in lines 512 and 514 of FIG. 5.

Inspection of the 3-D bar chart also reveals the significance of the "mb_chart" metadata generated by query line 562. The "mb_chart" metadata specifies the titles of the x- and y-axes. (It will, of course, be understood that the invention could be implemented to specify the same information in separate parameter fields like the title and subtitle fields 512 and 514 already provided.) The "mb_chart" metadata also instructs the system implementing the invention (see FIGS. 1–3) to pull the labels for the x-axis from the $3^{rd}$ column (identified by the number "2" because it is the third number one counts when starting from 0). Finally, the "mb_chart" metadata instructs the system to pull the y-values of the 3-D bar chart from the $4^{th}$ column (identified by the number "3"). It will be understood that the syntax employed in the mb_chart metadata is illustrative. Provided the reporting tool 210 can understand it, other syntax may be employed.

The data depicted in the 3-D chart 710 is also depicted, but with further detail, in table 720. The reader will notice the correspondence between the headings and data in the four columns of table 720 and the query lines 554, 556, 558, and 560 that generated them.

FIG. 8 shows illustrative parameters 800 defined for the drill-down report identified as "employee_sales_by_year_by_category" in field 810. Not coincidentally, this name is identified by reference in query line 564 of FIG. 5 and the sixth-column metadata of FIG. 6. Field 812 specifies the title of this report. Field 822 specifies a predefined report template for the report here, a cross tab report. Field 850 specifies the query that will generate the data of this particular report. Field 890 again specifies that the source of the data is the "MoreBetter_Traders_Database.db".

Notably, the query in FIG. 8 does not instruct the DBMS to generate any "report metadata" columns. This signifies that the report is a "terminal" report. It does not have a drill-down relationship to a yet more detailed report. The query, of course, could be modified in accordance with the present invention to include drill-down metadata, like the query shown in FIG. 5. But in order to preserve the simplicity of this illustration, such extensions are not depicted here.

Also notably, query line 872 depicts an argument "employeeid" enclosed in curly brackets. This signals the reporting tool 210 (FIG. 2) to substitute this argument with the value for "employeeid" passed by the drill-down reference to the report. Referring back to FIG. 6, it will be observed that the value passed for the argument "employeeid" by the drill-down references of the sixth column increase incrementally from row to row.

Figure 9:
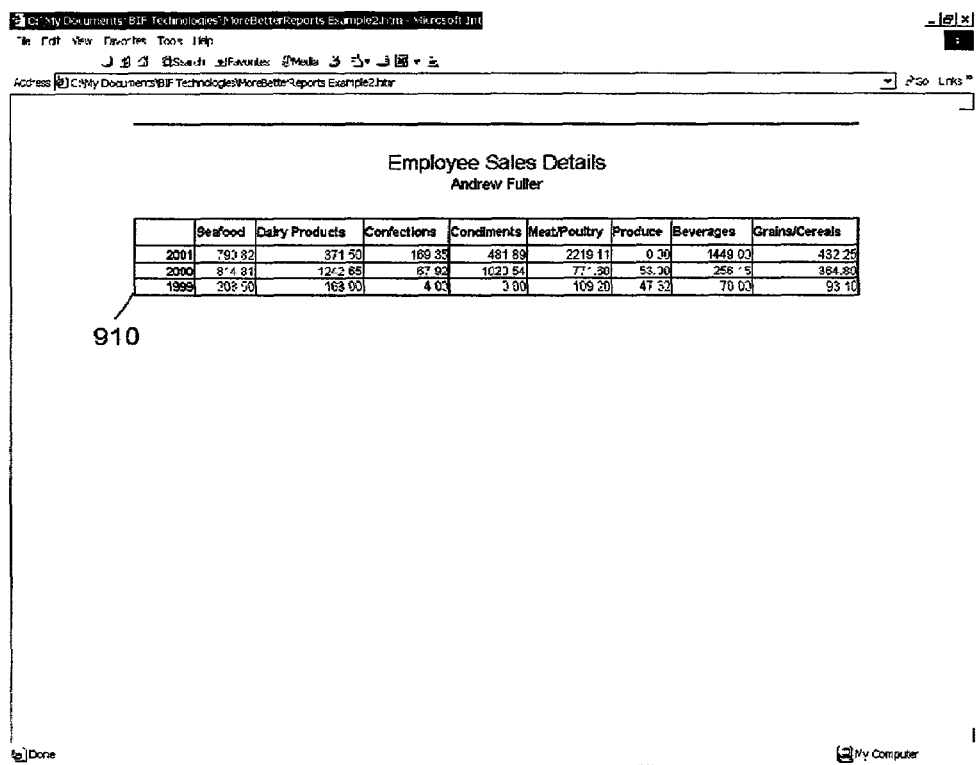
FIG. 9 is a bitmap screenshot of a drill-down report generated in accordance with the report parameters of FIG. 8, and in response to the selection of the 3D-bar or row corresponding with "Andrew Fuller" in FIG. 7.

Likewise, it will be observed that field 814 shows an argument called "employee_name" enclosed in curly brackets. As with the argument of line 872, the argument in field 814 signals the reporting tool 210 (FIG. 2) to substitute this argument with the value for "employee_name" passed by the drill-down reference to the report. Referring again back to FIG. 6, it is seen that the value passed for the argument "employee_name" also varies from row to row. In the second row, it is "Nancy Davolio." In the third, it is "Andrew Fuller." FIG. 9 is a bitmap screenshot 900 of a drill-down report generated in accordance with the report parameters of FIG. 8, in response to the selection of the 3D-bar or row corresponding with "Andrew Fuller" in FIG. 7. As suggested by the selection identified in the template field 822 of FIG. 8, the screenshot 900 depicts a cross tab chart 910. As indicated by the title field 812, the title of the chart 910 is "Employee Sales Details." Notably, the subtitle of the chart 910 is "Andrew Fuller," because, after all, this illustration assumes that the "Andrew Fuller" 3D-bar or row of FIG. 7 was selected. Moreover, this illustration assumes that the reporting tool 210 mapped the selection of the "Andrew Fuller"3D-bar or row of FIG. 7 to the corresponding row of FIG. 6. Furthermore, this illustration assumes that the reporting tool 210 substituted the parameters of the drill-down metadata field of the Andrew Fuller row of FIG. 6 for the corresponding curly bracketed arguments depicted in field 814 and query line 872 of FIG. 8. Thus, the subtitle is "Andrew Fuller," and the data depicted in the chart 910 corresponds with Andrew Fuller's sales by category by year.

Taken together, FIGS. 4–9 illustrate a preferred convention and method to generate reports and to define the drill-down relationships between those reports. They also illustrate how easy this invention makes it for someone skilled only in a single database query language, but not skilled in other procedural languages such as C, C++, or Java, to specify drill-down relationships between reports. A further advantage of this invention is that any reports generated by this method and convention can use the most current data from the customer's database. In this sense, the reports are dynamically driven.

FIGS. 10 through 13 illustrate a more abstract aspect of the invention two alternative conventions for specifying drill-down relationships between reports. FIGS. 10 and 11 depict the convention employed in the illustration of FIGS. 4–9. Window 1000 illustrates two column expressions nested within a SQL SELECT statement. The first column expression 1010 retrieves a column or an operation on a set of columns from the DBMS to which the SQL statement is directed. The second column expression 1020 instructs the DBMS to generate a metadata consisting of a column of character strings headed by the column heading 1030 specified in the column expression 1020. The character strings comprise metadata that define drill-down relationships between a first report associated with the data retrieved by the first column expression and one or more other reports.

Window 1100 depicts a suggested syntax for the drill-down expression. This syntax will generally be unimportant to the DBMS 200 (FIG. 2) which will generate whatever string it is asked to generate. But the syntax is important to the reporting tool 210, which recognizes the drilldown_metadata_column_heading 1030 as identifying a column containing drill-down metadata and parses strings produced by the DBMS for that column in order to identify the drill-down report and any arguments to pass to the drill-down report. In window 1100, the suggested syntax for the drill-down expression is the keyword "report_name=" followed by the actual name of the report optionally followed by (the square brackets signify optional matter) the character "&" followed by the name of a parameter followed by the character "=" followed by the value of the parameter optionally followed by yet more ampersands, parameter names, equal signs, and parameter values. The suggested syntax is identical to syntax commonly employed in HTTP requests.

FIG. 12 depicts an alternative syntactical embodiment of a drill-down expression for identifying and passing parameters to a drill-down report. Here, no keywords are used at all. Instead, the drill-down expression is simply the name of the drill-down report optionally followed by the open parenthesis character "(" followed by comma-delimited parameter values followed by the closed parenthesis character")". This alternative syntax is consistent with a function call, in which arguments specified within the parenthesis are passed to the function.

It would of course be possible to incorporate and standardize, at least in part, the concepts of the present invention by extending existing database query language standards or incorporating these extensions into a public or proprietary dialect of an existing database query language. FIG. 13 suggests a possible standard that involves the creation of four new reserved SQL or XML words "REPORT," "DEFINE," "DRILLDOWN," and "END REPORT" as depicted in lines 1310, 1320, 1360, and 1390. Line 1310 suggests a naming and argument-passing convention for a report. The title, subtitle, and other elements of the report could be defined or specified in the manner depicted by line 1320. Drill-down relationships to other reports would be specified in the form of a function call as suggested in line 1360. For example, a DRILLDOWN statement may specify one of the columns identified in the SELECT statement as an argument in the function call. The DRILLDOWN statement would then pass the particular row value for that column corresponding to the graphical element (e.g., a pie slice) selected by the end user.

Although the foregoing specific details describe a preferred embodiment of this invention, persons reasonably skilled in the art will recognize that various changes may be made in the details of the method and apparatus of this invention without departing from the spirit and scope of the invention as defined in the appended claims. Therefore, it should be understood that, unless otherwise specified, this invention is not to be limited to the specific details shown and described herein.

What is claimed is:

1. A computer implemented method to provide linked first and second reports to a user, the second report being provided in response to the user's selection of an element of a first report, the method comprising the actions of:

retrieve a first object that defines characteristics of the first report, the first object including a first query language instruction operable to retrieve a first data set from a database, the first query language instruction also including a linking instruction that specifies a linking relationship between at least a portion of the first data set and the second report, the first object further specifying a first report template to which the first data set is operable to be bound;

retrieve the first data set in response to the first query language instruction;

bind at least a portion of the first data set to the first report template;

publish the first report;

wait for the user to select an element of the first report;

if the user selects an element of the first report, map the user's selection to a corresponding portion of the first data set;

if the linking instruction specifies a linking relationship between the second report and the portion of the first data set corresponding to the user's selection, then retrieve a second object that defines characteristics of the second report, the second object including a second query language instruction operable to retrieve a second data set from said database or another database, the second object further specifying a second report template to which the second data set is operable to be bound;

retrieve the second data set in response to the second query language instruction;

bind the second data set to the second report template; and publish the second report.

2. The method of claim 1, where the linking instruction also includes a parameter to pass to the second object and to modify the second query language instruction therein, the method further comprising the following action if the action of retrieving the second object is performed:

translate the second query language instruction to incorporate the parameter passed by the linking instruction.

3. A reporting apparatus for a database comprising:

a computer;

a plurality of report pattern objects residing on the computer, each object defining characteristics of a report, including a query language statement operable to retrieve a result set from the database;

a data retrieving module operable to retrieve the result set specified by the query language statement;

a result set handling module operable to identify drill-down-report a linking identifier in the result set; and an event handling module operable to retrieve, in response to user requests, report pattern objects corresponding to drill-down reports specified in the linking identifier of the result set.

4. The reporting apparatus of claim 3, further comprising an editing module operable to enable the editing of the report pattern objects.

5. The reporting apparatus of claim 3, further comprising a translating module operable to incorporate parameters passed by the event handling module into the query language expressions of report pattern objects retrieved in response to user requests for drill-down reports.

6. The reporting apparatus of claim 3, further comprising a reporting module operable to generate report code corresponding to the result set on a user interface.

7. The reporting apparatus of claim 6, further comprising a presentation handler operable to display reports in accordance with the report code generated by the reporting module.

8. The reporting apparatus of claim 3, wherein the data retrieving module comprises at least a portion of a relational database management system.

* * * * *